United States Patent [19]
Soref

[11] Patent Number: 4,989,941
[45] Date of Patent: Feb. 5, 1991

[54] NORMAL INCIDENCE OPTICAL SWITCHES USING FERROELECTRIC LIQUID CRYSTALS

[75] Inventor: Richard A. Soref, Newton Centre, Mass.

[73] Assignee: The United States of America as represented by the Secretary of the Air Force, Washington, D.C.

[21] Appl. No.: 169,910

[22] Filed: Mar. 18, 1988

[51] Int. Cl.5 ............................................. G02B 6/32
[52] U.S. Cl. ............................... 350/96.18; 350/96.15
[58] Field of Search ........................... 350/96.15, 96.18

[56] References Cited

U.S. PATENT DOCUMENTS

| 4,269,511 | 5/1981 | Erwin | 356/368 |
| 4,278,327 | 7/1981 | McMahon et al. | 350/96.14 |
| 4,478,494 | 10/1984 | Soref | 350/381 |
| 4,556,727 | 12/1985 | Walba | 560/73 |
| 4,708,439 | 11/1987 | Ishii et al. | 350/331 R |
| 4,720,171 | 1/1988 | Baker | 350/331 R |
| 4,720,174 | 1/1988 | Baker | 350/96.15 |

Primary Examiner—William L. Sikes
Assistant Examiner—Robert E. Wise
Attorney, Agent, or Firm—Jules J. Morris; Donald J. Singer

[57] ABSTRACT

This invention comprises a new group of fiber optic switching devices that use layers of surface-established ferroelectric liquid crystals (FLCs) as the switching media. In each of the devices light impinges upon the ferroelectric liquid crystal at an angle of 90° (normal incidence) with the surface plane. Each FLC gives 0° or $\pi°$ optical rotation, depending upon the polarity of the electric voltage applied. A series of polarizing beam splitters are used to separate unpolarized light into its s and p polarization components. After ferroelectric liquid crystal switching, other polarizing beam splitters are used to direct the s and p light to output optical paths. The switches discussed below are voltage controlled 2×2, 1×4, 1×6, 1×8, 4×4, or N×N devices that use one or more layers of surface stabilized ferroelectric liquid crystals.

25 Claims, 6 Drawing Sheets

NORMAL INCIDENCE OPTICAL SWITCHES USING FERROELECTRIC LIQUID CRYSTALS

BACKGROUND OF THE INVENTION

This invention relates to optical switches and is particularly related to fast acting compact optical switches for communications and other fields A variety of fiber optic switches have been produced or proposed primarily for optical communications These switches rely on conventional nematic liquid crystals and are generally arranged in devices in which the optical signal contacts the crystal at an oblique angle. While these conventional devices have permitted successful optical switching they have some significant drawbacks.

The most serious problem with conventional optical switches is that they are relatively slow. While optical communications networks would appear to have great advantages over electronic networks, the conventional nematic switches can only operate in the range of 1-100 milliseconds which limits network speed. The second serious Problem with conventional liquid crystal switches is the geometric arrangements required for successful switching take up considerable space. Specifically, use of oblique incidence light requires relatively long switching arrangments.

Yet another problem with conventional optical switches is a lack of memory and numerous stability states. Unpowered nematic type switches may quickly become disordered and thus fail to direct optical signals according to the most recently selected path. In other words, such conventional switches do not have a memory and if left unpowered may give haphazard and undesired results.

In view of the above, a need exists for a fast acting optical switch that will increase the operating speeds of fiber optic networks.

A further need exists for a compact optical switch that allows further miniaturization of optical components.

Yet another need exists for a stable optical switch that continues to direct optical signals along a preselected path after removal of an activating signal.

SUMMARY OF THE INVENTION

The invention comprises an optical switch wherein an input optical fiber directs light onto a first polarization means that polarizes the incoming light and directs it to a ferroelectric liquid crystal (FLC) which is preferrably a smectic phase liquid crystal. In the preferred embodiment of the invention, the ferroelectric liquid crystal receives the polarized light at normal incidence and selectively changes the polarization state of the light received A second polarization means receives the light from the ferroelectric liquid crystal and directs it to output optic fibers according to its polarization state Control of the ferroelectric liquid crystal allows preselection of the polarization state of the output light which is thereby directed to a particular output path according to its polarization state.

In a preferred embodiment of the invention the second polarization means comprises a polarizing beam splitter that selectively directs the light from the ferroelectric liquid crystal (FLC) amongst output optic fibers In the preferred embodiment of the invention the FLC further comprises electrodes for changing the optical rotary power of the crystal in order to select the output polarization state of the optic signals. Further, the FLC selectively rotates polarized light between the s and p states and is bi-stable. Specifically, the bi-stable crystal will continue to rotate light according to a previous selection until the electrodes are activated to change the selection.

Another aspect of a preferred embodiment of the invention comprises the use of input optic fibers having a collimating lens for collimating light directed into the FLC Further, output optic fibers are provided with a lens for focusing the collimated light, from the FLC, onto the core of the selected output fiber.

In another preferred embodiment of the optical switch of the invention, multiple FLCs are used. Specifically, light (an optical signal) directed from a first polarization means is sent to a first FLC which selectively changes the polarization state of he light and directs it to a second polarizing means. The second polarizing means directs the light from the first FLC according to its polarization state into a second FLC which further selectively changes the polarization state of the light received. Light from second FLC is sent to one of a multitude of output fibers according to how its polarization state has been changed while passing through the switch. In this embodiment of the invention, it is preferred that the second FLC be subdivided into several adjacent areas that are individually addressable by means of multiple electrodes. Further, it is preferred that the second polarization means comprises a polarizing beam splitter for directing the optical signal to preferred addressable areas of the second FLC. A third polarization means can also be provided for further subdividing and directing light from the second FLC into a preselected optic fiber among several optic fibers It is therefore an object of this invention to provide a ferroelectric liquid crystal (FLC) optical switch for processing optical signals.

It is an advantage of this invention to provide an optical switch with a greatly increased operating speed.

It is a further object of this invention to provide a compact optical switch which is advantageous for miniaturizing optical circuitry.

Yet another object of this invention is to provide an optical switch having a memory capability such that optical signals will be directed along a preselected path until switch position is actively changed.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

This invention comprises a new group of fiber optic switching devices that use layers of surface-stabilized ferroelectric liquid crystals (FLCs) as the switching media. In each of the devices light impinges upon the ferroelectric liquid crystal at an angle of 90° with the surface plane, more simply stated, light is always normally incident upon the FLC. Each FLC gives 0° or 90° optical rotation, depending upon the polarity of the electric voltage applied. A series of polarizing beam splitters are used to separate unpolarized light into its s and p polarization components. After ferroelectric liquid crystal switching, other polarizing beam splitters are used to direct the s and p light to output optical paths. The switches discussed below are voltage controlled 2×2, 1×4, 1×6, 1×8, 4×4, or N×N devices that use one or more layers of surface stabilized ferroelectric liquid crystals (i.e., smectic phase liquid crystal elements).

Figure 7:
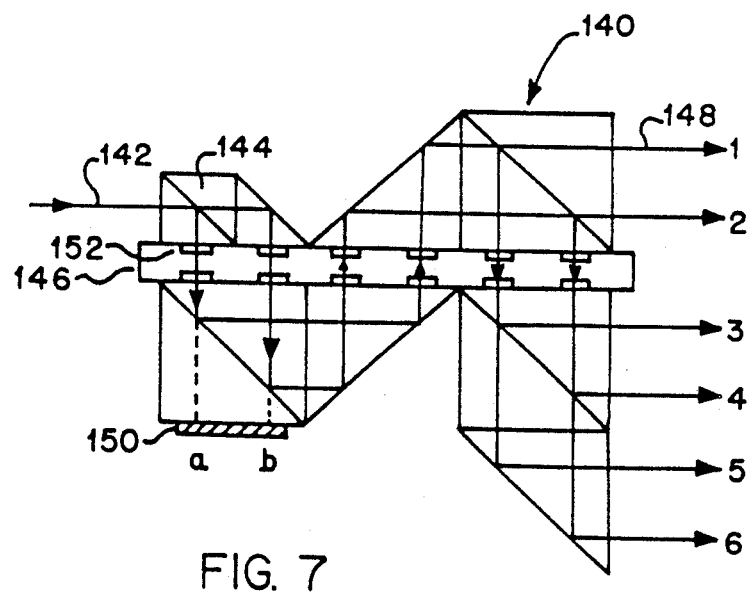
FIG. 7 is a schematic representation of a compact 1×6 optical switch using a single FLC layer.

These ferroelectric liquid crystal switches are practical and efficient devices for routing optical signals among single mode fibers or among multi-mode fiber transmission lines. All the switches described below are simple to construct, easy to manufacture and low in cost The smectic phase liquid crystal elements used in these switches offer a 1 to 10 microsecond switching time, 15 volt operation, a wide wavelength-range, polarization independence (if desired), low insertion loss, bi-stable or monostable operation, low optical crosstalk, and low power consumption. A variety of switches are shown and will be described with reference to the drawings These are different but related optical switching structures. The different switching structures can use one or several ferroelectric liquid crystal (FLC) layers. Manufacture of ferroelectric liquid crystal layers of the type used herein has been demonstrated by Displaytech Inc. of 2200 Central Ave Boulder, Colo. 80301, and has been disclosed in their patents and publications. The ferroelectric liquid crystal layers of Displaytech are, in this invention, combined with polarizing beam splitters to produce compact normal incident switches. Polarizing beam splitters are well-known and are made by depositing a multi-layer dielectric stack on the hypotenuse of a glass cube. Polarizing beam splitters separate unpolarized light in s and p components that travel in paths separated by a 90° angle As will be shown below, this invention allows monolithic stacking of switches, side-by-side. This is done by physically extending the polarizing beam splitters in the z direction (the polarizing beam splitters segregate light in the x and y directions). Generally, an optical cascade of polarizing beam splitters and active ferroelectric liquid crystals are used to form complex switches In some switches, light makes multiple passes through one FLC while in others, there are multiple FLC panels and multiple polarizing beam splitters. To make a switch with −40 dB of optical crosstalk four switches with −20 dB each of optical crosstalk are cascaded; this results in a compound (complex) switch Also aught is how to construct a 4×4 nonblocking matrix switch. This switch is shown in FIG. 7 and discussed below. One can construct switches that do, or do not require optically polarized input and/or produce a polarized output Polarizing switches have the drawback that their throughput loss is more than 3 dB, assuming unpolarized input light. These switches however are simple and useful for 1×N routing. Polarization-independent switches have a loss of only about 1 dB for any fiber. These switches, however, are more complex because the input light is first split (polarized) and then recombined.

A detailed but generally applicable description of a typical switch is given below, followed by a short description of each additional preferred switch embodiment Referring to the cross-sectional view of the compact 1×4 optical switch shown in FIG. 1, the optical switch 10 is typically connected to an input optic fiber 12 which includes a lens 14. The lens 14 is typically a Selfoc lens that is provided to collimate light from the optic fiber into the switch structure. At each output optic fiber 16 another lens 18 is provided to refocus the collimated light from the switch onto the core of the output fiber. The smaller the input core, the better the collimation.

Unpolarized light from input optic fiber 12 is collimated and transmitted to beam splitter 30, where either s or p light, depending on beam splitter configuration, is transmitted to a light absorber 32. The remaining polarized (s or p) light is transmitted to the ferroelectric liquid crystal (FLC) layer 20 at control area 26. The light falling on the ferroelectric liquid crystal is therefore either s or p; that is, the light is linearly polarized.

In typical switch 10 a single FLC layer 20 is subdivided into three adjacent areas 22, 24, and 26. Each of these adjacent areas is individually addressable by an electrical voltage means 28.

The light signal passing through the FLC is either transmitted through unchanged or has its polarization state rotated 90°. The optical polarization is at a 0° or a 45° angle with respect to the optic axis of the ferroelectric crystal pixel, as described in Diplaytech publications. The ferroelectric liquid crystal is manufactured with a 22° tilt angle, with a specific birefringence for the liquid and with a specific plate spacing. Thus the optical rotary power of the ferroelectric liquid crystal pixel will be either 0° or 90°, depending upon drive voltage As a result, s and p polarization state light is either unchanged, in traversing the FLC, p or s state is changed to p state light and state is changed to s state light. The 0° or 90° transformation is chosen for optical switching because the output polarizing beam splitters send s and p light in different directions. Switches can also be designed to recombine s and p light at a preferred output fiber in order to simulate an unpolarized switch.

Figure 1:
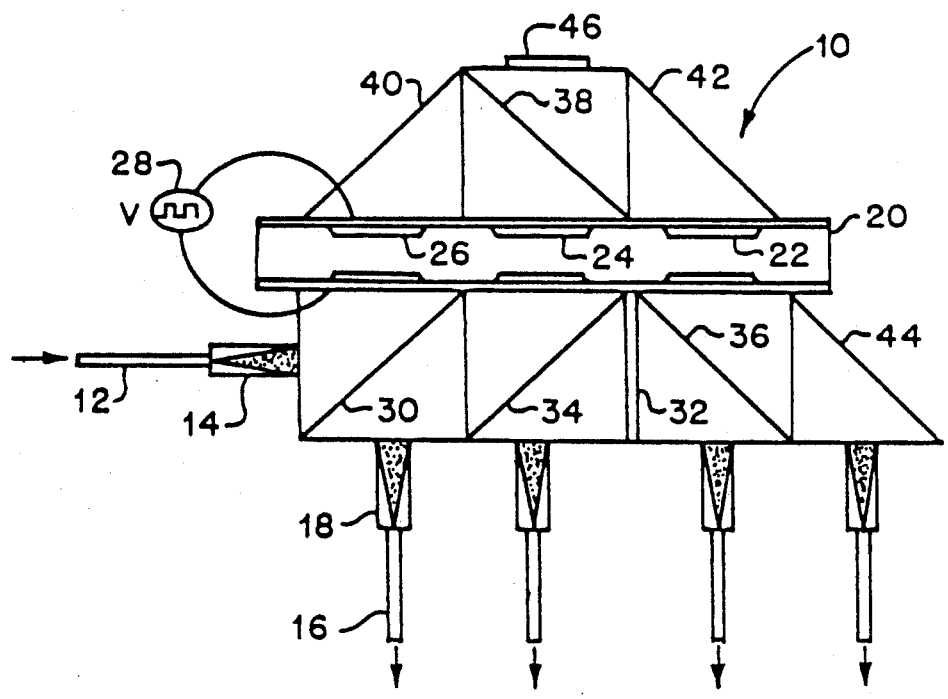
FIG. 1 is a schematic cross-sectional representation of a compact multi-way 1×4 electro-optical liquid crystal switch; incorporating he principles of this invention.
Figure 2:
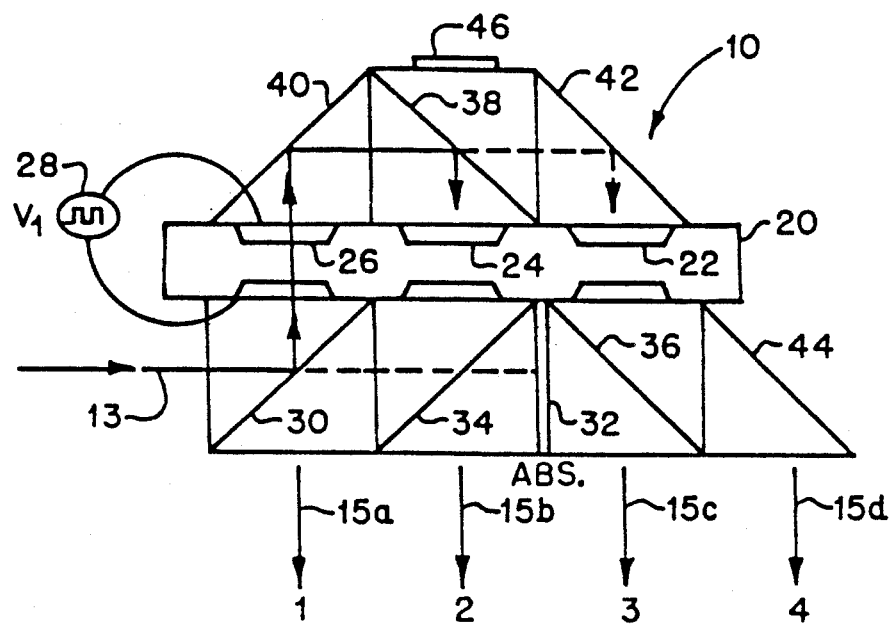
FIG. 2 is a schematic representation of the compact 1×4 optical switch of FIG. 1 with a diagramatic representation of optical signal routing through the switch.
Figure 3:
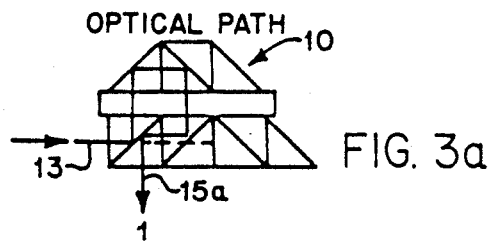
FIGS. 3A through 3B, 3C and 3D are schematic representations of optical switching through the optical switch of FIG. 1.
Figure 3:
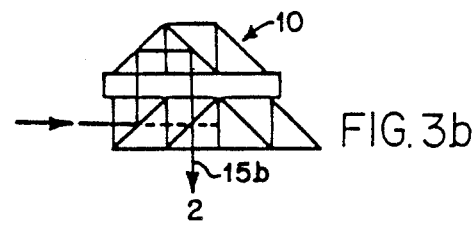
Figure 3:
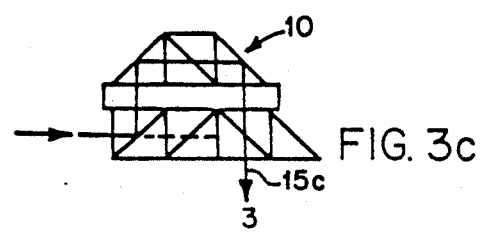
Figure 3:
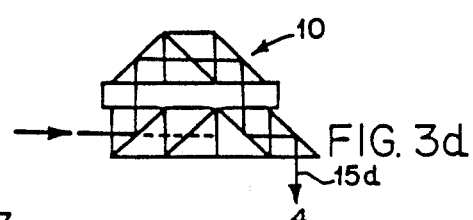
Figure 4:
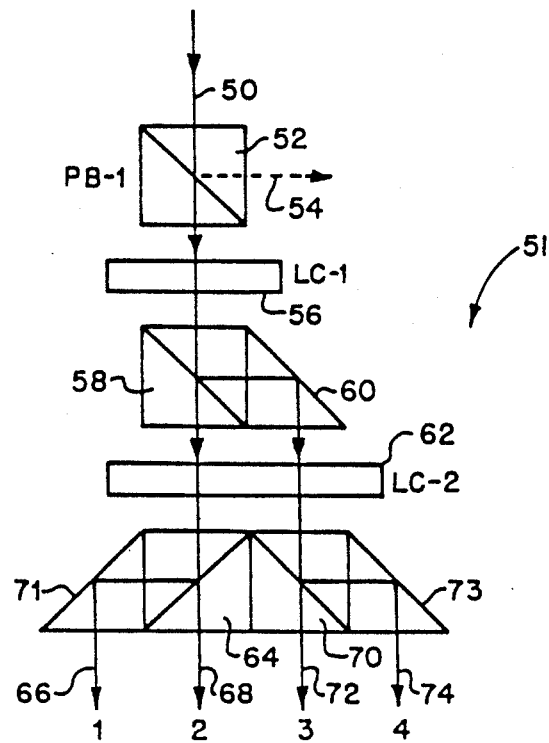
FIG. 4 is a schematic exploded representation of an alternate multi-way 1×4 electro-optical liquid crystal switch which also incorporates the principles of this invention.

FIG. 2 is a schematic representation showing optical Paths through the compact 1×4 optical switch of FIG. 1. An input optical signal (unpolarized) 13 enters switch 10 and is both transmitted and reflected by the first polarizing beam splitter 30. Thus the polarizing beam splitter 30 separates the light into its polarized optical components (s and p) one of which is absorbed (32) while the other is transmitted through FLC 20. This signal either remains unchanged or has its polarization state changed by first addressable FLC area 26. The signal is then reflected by 45° mirror (right angle prism) 40 into the second polarizing beam splitter 38. Depending upon the polarization state of the signal at beam splitter 38, the light is either reflected back into the FLC directly at addressable area 24 or is transmitted to 45° mirror 42 and sent to addressable area 22. The signal sent through FLC area 24 is either transmitted or reflected by polarizing beam splitter 32 depending on the rotary polarizing operation of .he FLC. If reflected, the light is sent back into polarizing beam splitter 30 and out in the first output 15a (See FIG. 3a). If transmitted, (through polarizing beam splitter 34) the light exits the switch at output 15b (FIG. 3b). If, however, light has been transmitted through polarizing beam splitter 38 and traverses the FLC at area 22, the light is directed by polarizing beam splitter 36 either into the third output 15c (FIG. 3c) or to the fourth output 15d (FIG. 3d). 45° mirror 44 is used for directing optic signals into the fourth output fiber 15d and a light absorber 46 absorbs inadvertently reflected or transmitted light A simple multi-way 1×4 electro-optical liquid crystal switch based on a switching tree approach is shown in exploded schematic form in FIG. 4. Light from an input fiber 50 enters a polarizing beam splitter 52. The polarizing beam splitter reflects light of one polarized state (p or s) which is absorbed (54), and transmits polarized light of a second polarized state (s or p) to a first ferroelectric liquid crystal (FLC) 56. Depending upon the selected rotary optical power (0° or 90°) of FLC 56, the polarized light leaving the liquid crystal is either reflected or transmitted by a second polarizing beam splitter 58 If reflected, the polarized light enters a diagonal reflecting mirror 60 and is directed to the right side of a second FLC 62. If transmitted directly through polarizing beam splitter 58 the light enters the left side of the FLC 62. The output path (66, 68, 72, 74) of the light signal directed to the second FLC 62 is determined by changing or leaving unchanged the polarization state of the optic signal Light leaving the left side of FLC 62 is directed to polarizing beam splitter 64 where the light is either reflected through a diagonal mirror into first output port 66 or transmitted directly through the beam splitter into second output port 68.

If the light signal was reflected by second polarizing beam splitter 58 and directed into the right side of FLC 62 it enters output beam splitter 70. Light transmitted through output beam splitter 70 is directed to the third output port 72 while light reflected by output beam splitter 70 is reflected by diagonal mirror 73 into the fourth output port 74.

Figure 5:
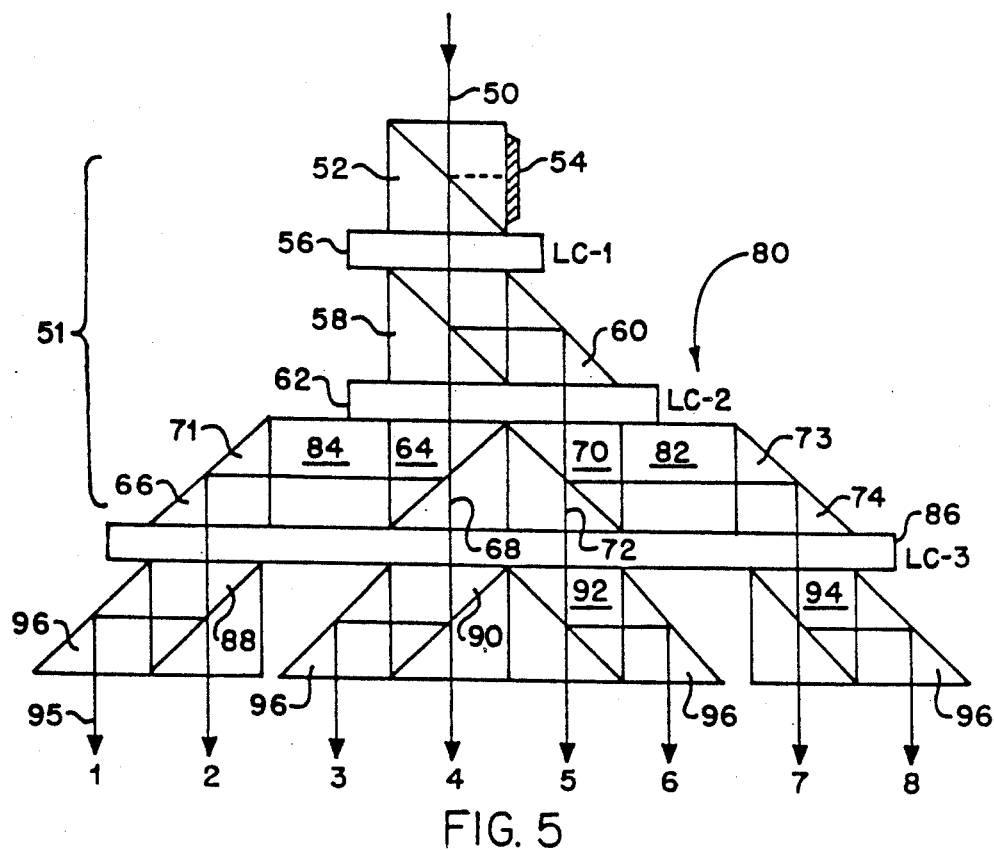
FIG. 5 is a schematic representation of a multi-way 1×8 electro-optical liquid crystal switch.

A more complex 1×8 multi-way electro-optical FLC switch 80 based on the switching tree approach, is shown in schematic form in FIG. 5. Switch 80 incorporates the 1×4 multi-way switch 51, previously discussed, and identical reference numerals are used for repeated components. Light 50 enters the 1×8 switch 80 from input fiber 50 and is directed into one of four intermediate output paths 66, 68, 72 and 74 which correspond to the output paths of switch 51. Spacers 82 and 84 have been added to spread out the adjacent output paths. In switch 80 an additional FLC 86 is used to act upon light passing through the preselected intermediate output paths 66, 68, 72 and 74. Light is thereby directed into one of the final output beam splitters 88, 90, 92, and 94 which direct light into one of eight output fibers 95 which have been numbered 1 through 8. Four 45° diagonal mirrors 96 are used in conjunction with the polarizing beam splitters to direct the optical signals to preselected output fibers 95.

Figure 6:
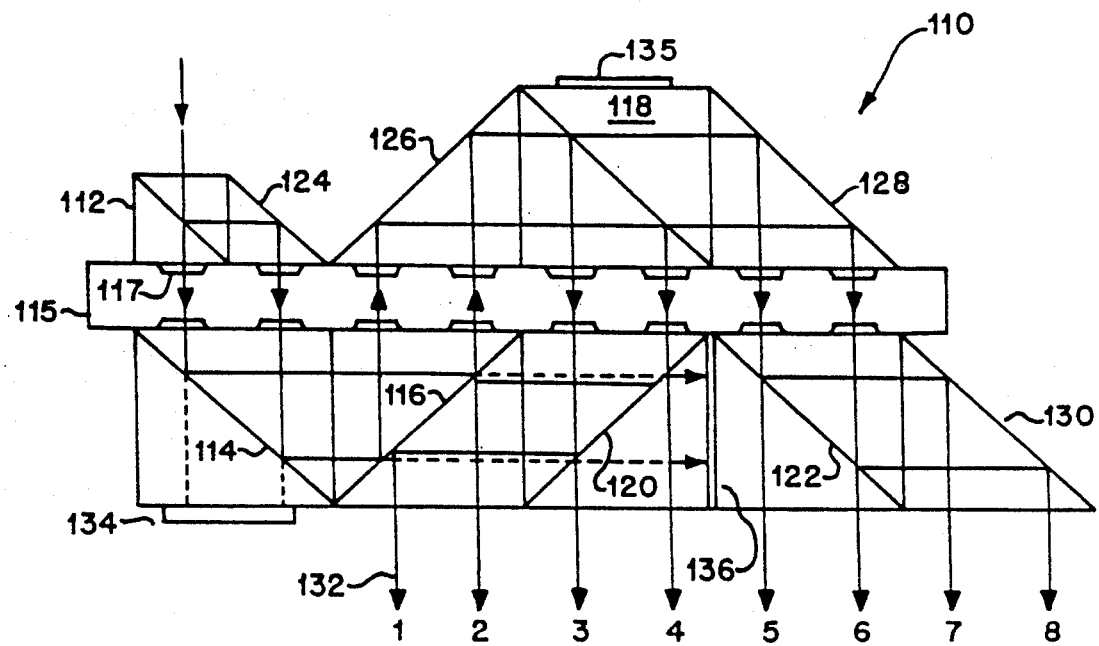
FIG. 6 is a schematic representation of a compact 1×8 optical switch using a single FLC layer.

FIG. 6 is a schematic representation of a compact 1×8 optical switch 110 using only a single FLC. The switch 110 makes use of an FLC 115 having eight addressable areas 117. Polarizing beam splitters 112, 114, 116, 118, 120 and 122 are used to discriminate between the polarized light signals transmitted multiple times across the FLC. Mirrors (45°) are used to direct the signal back and forth across the FLC and into one of the eight output optic fibers 132. The 45° mirrors are numbered 124, 126, 128 and 130. Undesired polarized light is absorbed at absorbers 134, 135 and 136. The switch is operated in a manner almost identical to that discussed with reference to FIG. 4.

FIG. 7 is a schematic representation of compact 1×6 optical switch using only a single FLC. Once again a component of the unpolarized input signal 142 is divided by a polarizing beam splitter 144 and directed through a series of 45° mirrors and polarizing beam splitters and makes multiple passes through FLC 146. The optical signal is ultimately directed to a preselected output fiber 148. In this particular device either the s or p component may be selected for ultimate transmission depending upon the output desired. Unused portions of the input signal are absorbed by absorber 150. The FLC layer 146 comprises six individually addressable areas 152 which can be controlled by a voltage source to cause either 90° rotation or 0° rotation of the optical signal's polarization.

Figure 8:
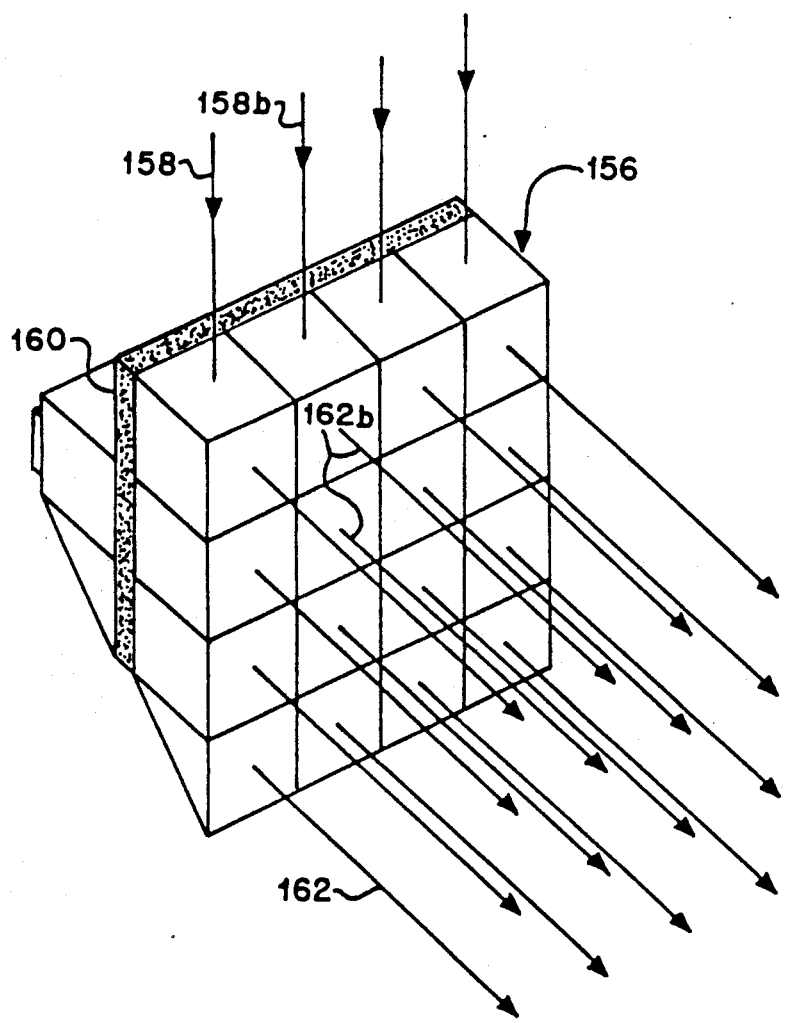
FIG. 8 is a perspective representation of an optical switching device comprising four 1×4 optical switches of the type described with reference to FIGS. 1-3.

FIG. 8 is a perspective representation of four independent 1×4 optical switches (of FIG. 1) stacked in parallel planes and controlled by a single FLC layer 160. The combined switch 156 has multiple inputs 158, all of which are directed through FLC 160. Any of the inputs can be sent to any of the outputs 162 in the same switch plane as the input (for example, 158b to 162b).

Figure 9:
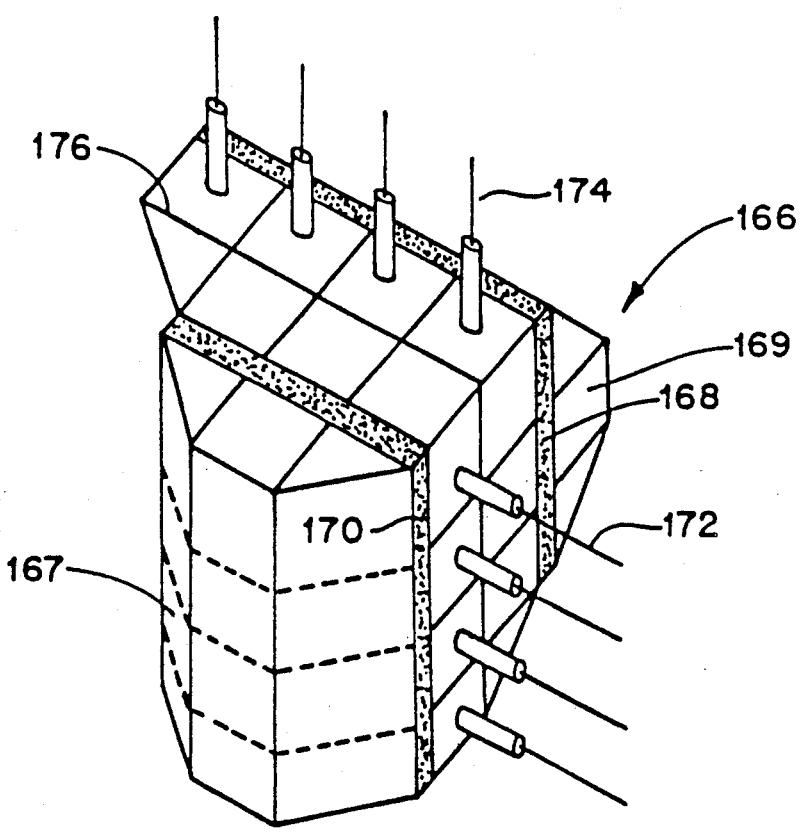
FIG. 9 is a perspective representation of a 4×4 optical signal exchange controlled by two FLC layers.

FIG. 9 is a perspective representation of a 4×4 optical switch 166 having two FLC layers. In this 4×4 switch a first quartet of 1×4 switches 167 has been cascaded with a second quartet of 1×4 switches 169 in order to form a 4×4 nonblocking matrix switch. Each quartet or module, is equivalent to the 1×4 switch of FIG. 8 and shares a FLC panel (168 or 170). In this nonblocking switch any of the inputs 172 may be directed to any of the outputs 174. Half-wave plates 176 are interposed between the two switch modules in order to selectively rotate by 90° the polarization of the light passing therebetween. The half-wave plates are used selectively so that the polarization of the light passing to the second module 169 is compatible with what it can accept. Specifically, the half-wave plates are used at the four corners and at the four most central areas where light is passed between the modules.

Figure 10:
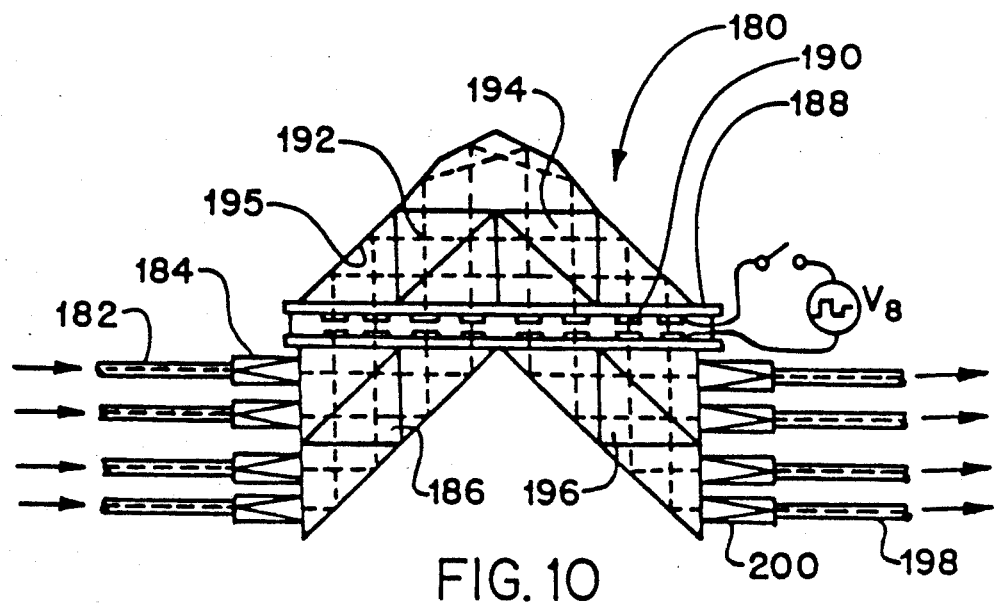
FIG. 10 is a schematic representation of a planar 4×4 optical matrix switch activated by one FLC layer with eight addressable regions.

FIG. 10 is a schematic representation of a polarization independent planar 4×4 optical matrix switch 180 actuated by a single FLC layer 188 with eight addressable areas 190 and can achieve 16 out 24 possible distinct states This switch 180 has four input optic fibers 182 having four collimating lenses 184. Optical signals entering switch 180 are separated into polarized s and p portions by polarizing beam splitter 186 These polarized portions of the signal are then directed through ferroelectric layer 188 and are rotated 90° or 0° depending on the output selection in the particular addressable are 190. Use of beam splitters 192, 194, 196 and internal mirrored structure surfaces 195 permit direction of both portions of the polarized light to a particular output fiber 198 and their recombination at an output focusing lens 200. Thus, the 4×4 optical matrix switch 180 can be used to deliver a complete optical signal between any one of the inputs 182 and any of the outputs 198. As a polarization independent switch optical, loss is minimized to about 1 dB for any signal These polarization independent switches, however, are somewhat more complex in operation than the polarized switches discussed above. This is because the input light must first be split, controlled and recombined at the same output fiber This increased complexity of the optical signal routing requires multiple addressable regions 190 in the FLC layer 188

Figure 11:
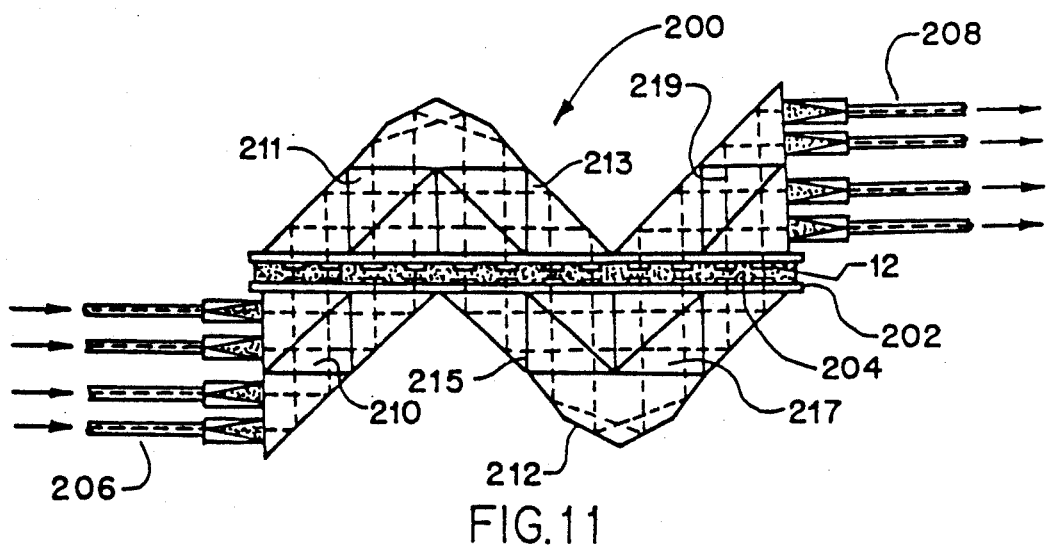
FIG. 11 is a schematic representation of a planer 4×4 optical matrix sWitch actuated by one FLC layer with twelve addressable regions.

A similar polarization independent 4×4 optical matrix switch 200 is shown in FIG. 11 which can achieve all 24 possible switching configurations. The 4×4 switch 200 has a single FLC layer 202 with twelve addressable areas 204. Switch 200 has four input fibers 206 which deliver light to an input polarizing beam splitter 210. This divides the light into its p and s polarized components and directs it through multiple passes of he ferroelectric crystal 204. This is done through multiple beam splitters 211, 213, 215, 217, and 219 as well as the internally reflective surfaces of the switch body 212. Thus, the individual components are controlled by the multiple addressable areas and are recombined in any of the output fibers 208. Operation of complex polarization independent switches can be more readily understood by examination a simpler switch in more detail, such a switch is shown in the drawing of FIG. 12.

Figure 12:
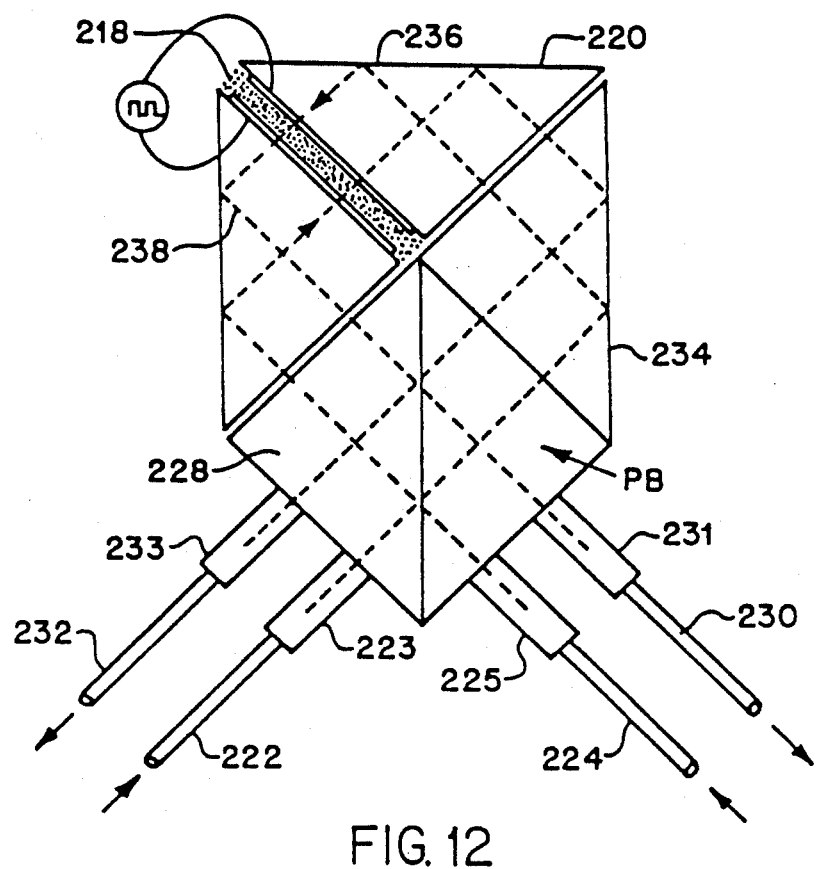
FIG. 12 is a schematic representation of a low cost design for a 2×2 optical switch utilizing a single polarizing beam splitter and a single FLC layer.

FIG. 12 is a schematic representation of a low cost design for a polarization independent 2×2 optical switch using a single polarizing beam splitter 228 and a single FLC layer 218. The 2×2 switch 220 has input fibers 222 and 224 with associated collimating lenses 223 and 225. It also has two output fibers 230 and 232 with associated focusing lenses 231 and 233.

An optical signal entering through input fiber 222 is divided by polarizing beam splitter 228 into s and p components, one of which (s) is transmitted through the polarizing beam splitter to internally reflective surface 234. This (s) component is directed to internal surface 236 and through the FLC layer 218 which in this case does not change the polarization state of the signal. The signal hen reflected by internal surface 238 and transmitted back through the polarizing beam splitter and out into output fiber 230. The other polarization state (p) is reflected by the polarizing beam splitter upon entering through fiber 222. This reflected signal is subsequently reflected by internally reflective surface 238 sent through the ferroelectric crystal which does not change its polarization state. The p signal then is reflected by surfaces 236 and 234. and then for a second time by the polarizing beam splitter so that it is recombined with the rest of the optical signal in output fiber 230.

When the FLC 218 is energized to change polarization states. the input signal is transmitted through the polarizing beam splitter in one polarization state and reflected on its second pass therethrough. This results in the light being divided and then recombined in output fiber 232. Thus, in operation of this switch any input signal from either of the input optic fibers can be directed in its entirety to either of the output optic fibers with low optical signal loss. This is a simple but effective polarization independent optical switch design.

We have therefore shown how we can use optical cascades of polarizing beam splitters and ferroelectric liquid crystals to provide a multitude of optical switches for communications and other optical signal processing uses.

Complex paths including multiple forward/backward passes through ferroelectric liquid crystal layers are used. The FLC panels are divided up into novel individually addressable areas and a specific tilt angle is used for 0° to 90° rotation Further, polarizing beam splitters are extended in the lateral direction in a novel manner. These compound switching structures are particularly useful for low cross-talk switching applications. In some of the stacking arrangements multiple switches share a single ferroelectric liquid crystal layer for multiple optical paths. In all of the above switches, smectic FLCs are used because they have three orders of magnitude faster operating speeds than conventional twisted nematic switches. Smectic liquid crystal layer can also be constructed to about one-half the thickness of nematic switches (i.e., about 1-2 microns) to allow the desired optical phase retardation for half-wave plate action. This permits the construction of more compact switches Finally, this invention gives a cost effective microsecond, high performance N×N switch design for use in optical processing. Many of the switches should be relatively inexpensive to construct with any of a package of desirable features.

While the invention has been described with reference to the preferred embodiments thereof, it will be understood by those skilled in the art that various changes in substance and form can be made therein without departing from the spirit and scope of the invention as described in the appended claims.

I claim:
1. An optical path routing switch comprising:
 (a) a ferroelectric liquid crystal means for receiving at least one optical signal and having means for selectively changing the polarization state of the optical signal passing through said ferroelectric crystal means;
 (b) a first light waveguide means for directing an optical signal into the ferroelectric liquid crystal means at substantially normal incidence thereto; and
 (c) second light waveguide means for directing an optical signal emerging from said ferroelectric liquid crystal away from said liquid crystal along at least one path according to the polarization state of the optical signal passing through said ferroelectric crystal means.
2. The fiber optic switch of claim 1 wherein said ferroelectric liquid crystal is a smectic phase liquid crystal.

3. The optical switch of claim 1 wherein the ferroelectric crystal means includes electrodes for changing the optical rotary power of the ferroelectric liquid crystal means.

4. The optical switch of claim 3 wherein said ferroelectric liquid crystal means selectively rotates polarized light of said optical signal between s and p states.

5. The optical switch of claim 3 including a polarizing beam splitter for dividing the optical signal passing through said first light waveguide means into separate polarized beams.

6. The optical switch of claim 5 wherein said ferroelectric liquid crystal means selectively rotates polarized light of said optical signal between s and p states.

7. The optical switch of claim 1 including a polarizing beam splitter for directing the optical signal transmitted through said ferroelectric crystal means to a desired output optic fiber.

8. The optical switch of claim 1 wherein in said first light waveguide means further includes a collimating lens for collimating the optical signal directed into said ferroelectric liquid crystal means.

9. The optical switch of claim 8 wherein in said second light waveguide means further includes a lens for focusing collimated light of said optical signal transmitted through said ferroelectric crystal means onto the core of an optic fiber.

10. The optical switch of claim 1 wherein in said ferroelectric liquid crystal means is self-divided into adjacent areas that are individually addressable by means of multiple electrodes.

11. A fiber optic switch comprising:
an input fiber for directing light into the switch;
a first polarization means for polarizing light directed to the switch by the fiber optic fiber;
a ferroelectric crystal for receiving light from said polarization means at normal incidence and selectively changing the polarization state of the light received;
a second polarization means for receiving light from said ferroelectric crystal and directing the light in one direction if said light is in a first polarization state and in another direction if said light is in a second polarization state; and
output optic fibers for selectively receiving light from said polarization means and directing the light away from the switch.

12. The fiber optic switch of claim 11 wherein the second polarization means comprises a polarizing beam splitter that selectively directs light to output optic fibers according to its polarization.

13. The fiber optic switch of claim 11 wherein the ferroelectric crystal comprises electrodes for changing the optical rotary power of the ferroelectric crystal.

14. The fiber optic switch of claim 13 wherein said ferroelectric crystal selectively rotates polarized light between s and p states.

15. The fiber optic switch of claim 14 wherein said ferroelectric crystal is subdivided into adjacent areas that are individually addressable by means of multiple electrodes.

16. The fiber optic switch of claim 15 wherein said ferroelectric liquid crystal is a smectic phase liquid crystal.

17. The fiber optic switch of claim 11 wherein said input optic fiber further comprises a collimating lens for collimating light directed into said ferroelectric liquid crystal.

18. The fiber optic switch of claim 17 wherein said output optic fibers further comprises a lens for focusing collimated light from said ferroelectric crystal onto the core of the optic fiber.

19. The fiber optic switch of claim 11 wherein said ferroelectric liquid crystal is a smectic phase liquid crystal.

20. A fiber optic switch comprising:
an input fiber for directing light into the switch;
a first polarization means for polarizing light directed to the switch by the fiber optic fiber;
a first ferroelectric crystal for receiving light from said polarization means at normal incidence and selectively changing the polarization state of the light received;
a second polarization means for receiving light from said first ferroelectric crystal and directing the light in one direction if said light is in a first polarization state and in another direction of said light is in a second polarization state;
a second ferroelectric crystal for receiving light from said second polarization means at normal incidence and selectively changing the polarization state of the light received; and
output optic fibers for selectively receiving light from said second ferroelectric crystal and directing the light away from said switch.

21. The fiber optic switch of claim 20 wherein said second ferroelectric crystal is subdivided into adjacent areas that are individually addressable by means of multiple electrodes.

22. The fiber optic switch of claim 21 wherein said ferroelectric liquid crystal is a smectic phase liquid crystal.

23. The fiber optic switch of claim 20 wherein said second polarization means comprises a polarizing beam splitter.

24. The fiber optic switch of claim 20 further comprising a third polarization means for directing light into said output optic fibers.

25. The fiber optic switch of claim 20 wherein said ferroelectric liquid crystal is a smectic phase liquid crystal.

* * * * *